Sept. 9, 1969 E. B. GUIMOND 3,466,396

TELEPHONE ANSWERING APPARATUS

Filed May 23, 1966 4 Sheets-Sheet 1

INVENTOR.
EDWARD B. GUIMOND

BY Jack M. Wiseman

ATTORNEY

INVENTOR.
EDWARD B. GUIMOND
BY Jack M. Wiseman
ATTORNEY

Sept. 9, 1969 E. B. GUIMOND 3,466,396

TELEPHONE ANSWERING APPARATUS

Filed May 23, 1966 4 Sheets-Sheet 3

INVENTOR.
EDWARD B. GUIMOND
BY Jack M. Wiseman
ATTORNEY

Sept. 9, 1969 E. B. GUIMOND 3,466,396

TELEPHONE ANSWERING APPARATUS

Filed May 23, 1966 4 Sheets-Sheet 4

INVENTOR.
EDWARD B. GUIMOND

BY Jack M. Wiseman

ATTORNEY

United States Patent Office 3,466,396

Patented Sept. 9, 1969

3,466,396

TELEPHONE ANSWERING APPARATUS

Edward B. Guimond, San Jose, Calif., assignor, by direct and mesne assignments, to Quikphone, Inc., a corporation of California Filed May 23, 1966, Ser. No. 552,270
Int. Cl. H04m *11/10*
U.S. Cl. 179—6 7 Claims

ABSTRACT OF THE DISCLOSURE

A telephone answering apparatus in which a ringing tone sensing device is energized by an incoming coil to operate a relay. The operation of the relay completes a circuit to operate a handset lifting mechanism to establish a connection between the subscriber and the incoming caller. The relay also operates a playback mechanism to transmit a pre-recorded message to the incoming caller. The playback mechanism includes an endless tape with a conductor strip to mark the end of the pre-recorded message. The sensing of the conductor strip by a transistor and relay circuit serves to maintain the lifting mechanism in the operated position, deactivate the playback mechanism and to operate a record mechanism to receive an incoming message. An R-C timing circuit turns off the last mentioned circuit after a predetermined time interval to prepare the apparatus for a succeeding incoming call.

The present invention relates in general to apparatus for recording messages, and more particularly to a telephone answering apparatus.

An object of the present invention is to provide improved telephone answering apparatus.

Another object of the present invention is to provide an improved telephone handset lifting mechanism for telephone answering apparatus.

Another object of the present invention is to provide improved mechanical connections between the subscriber telephone device and telephone answering apparatus.

Another object of the present invention is to provide an improved arrangement for detecting an incoming call signal to a subscriber telephone device for telephone answering apparatus.

Another object of the present invention is to provide an improved time delay circuit for telephone answering apparatus.

Other and further objects and advantages of the present invention will be apparent to one skilled in the art from the following description taken in conjunction with the accompanying drawings, in which.

Figure 1:
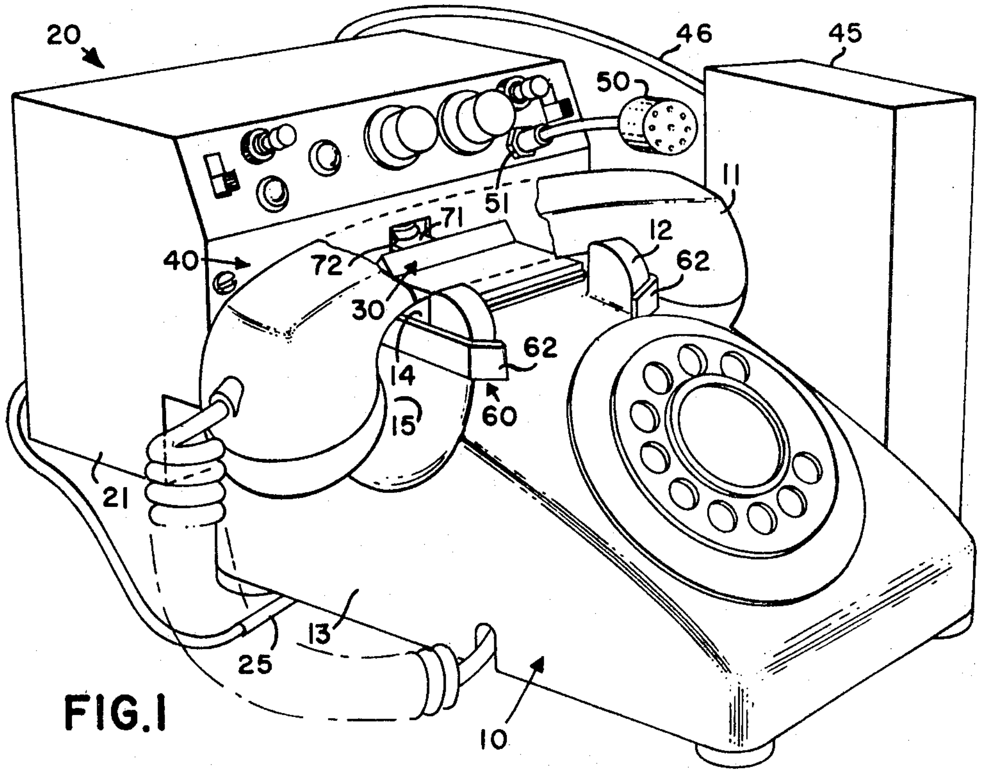
FIG. 1 is a perspective view of the telephone answering apparatus of the present invention.

Illustrated in FIG. 1 is a conventional subscriber telephone device 10 which includes a removable handset 11 resting on a cradle 12. Projecting into the cradle 12 are well-known plunger switches, not shown, which when released from engagement with the handset 11 serve to electrically connect the subscriber telephone device 10 with telephone exchange equipment and when depressed by the handset 11 serve to electrically release or disconnect the subscriber telephone device 10 from telephone exchange equipment.

The subscriber telephone device 10 comprises a housing 13 with an upright, lower rear wall and with the cradle 12 exposed from the rear of the subscriber telephone device 10. The cradle 12 seats forwardly of the lower rear wall and inwardly of the end walls of the housing 13. A space 14 as provided in the subscriber telephone device 10 between a horizontal wall of the housing 13 and the confronting wall of the handset 11 between the upright posts of the cradle 12 while the handset 11 rests on the cradle 12. Also, spaces 15 are provided between the cradle 12 and the outwardly confronting ends of the handset 11. The forward wall of the housing 13 is recessed at the lower portion thereof.

Figure 7:
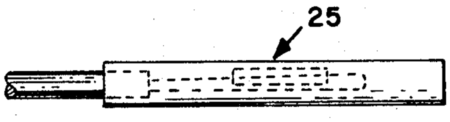
FIG. 7 is a fragmentary elevation view of the reed, ringing tone sensing switch employed in the telephone answering apparatus of the present invention.

As shown in FIGS. 1–4, the telephone answering apparatus 20 of the present invention comprises a housing 21. Mounted on the housing 21 is a socket 22 (FIGS. 2 and 4) for receiving one end of the cable of a reed, ringing tone sensing switch 25 (FIGS. 1 and 7). The other end of the cable for the reed, ringing tone sensing switch 25 is disposed in the vicinity of the ringing coil for the subscriber telephone device 10.

Figure 8:
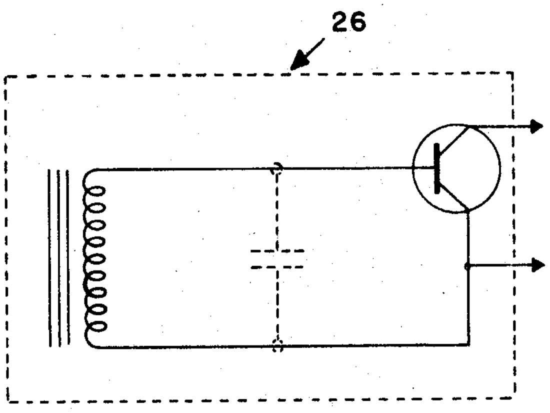
FIG. 8 is a schemetic diagram of an induction ringing sensor.

Projecting forwardly of the housing 21 is a handset lifting mechanism 30 (FIGS. 1 and 2), which is actuated through a circuit 35 (FIG. 6) to lift the handset 11 of the subscriber telephone device 10 in response to the reed, ringing tone sensing switch 25 sensing the energization of the ringing coil of the subscriber telephone device 10. Should it be desired a transistorized inductance coil ringing sensor device 26 (FIG. 8) may be employed in lieu of the reed, ringing tone sensing switch 25.

Figure 2:
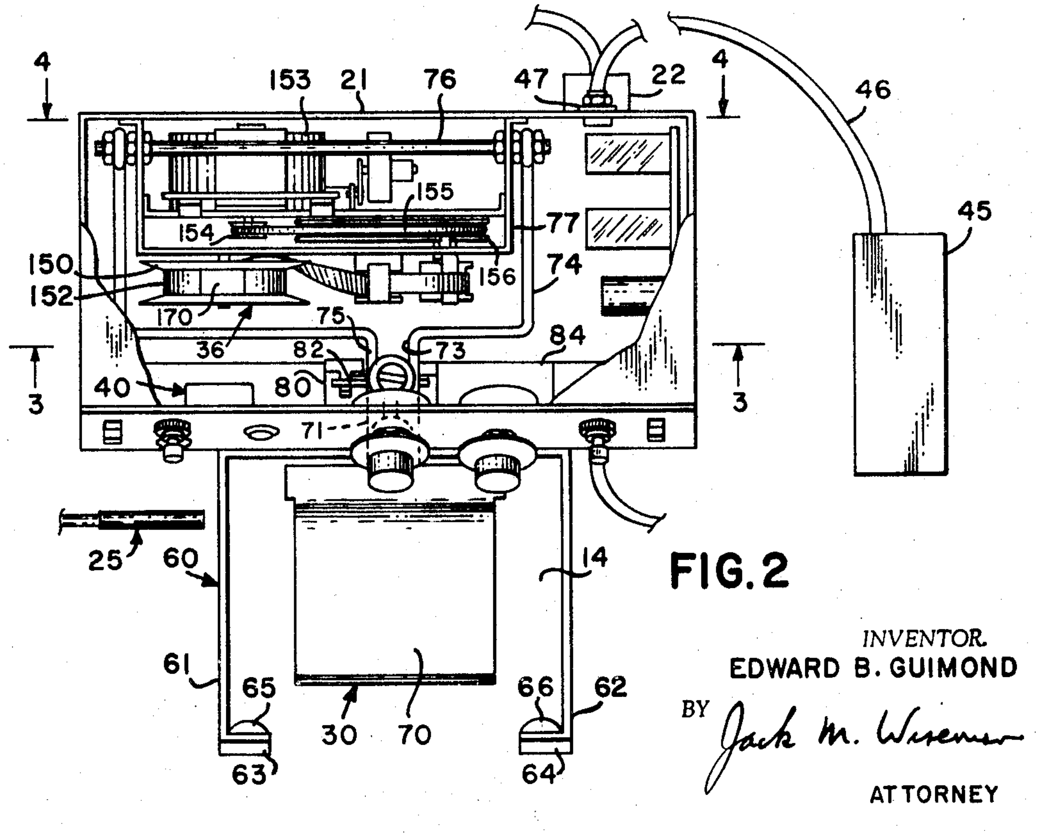
FIG. 2 is a plan view of the telephone answering apparatus shown in FIG. 1 with a portion of the top wall of the housing broken away.
Figure 3:
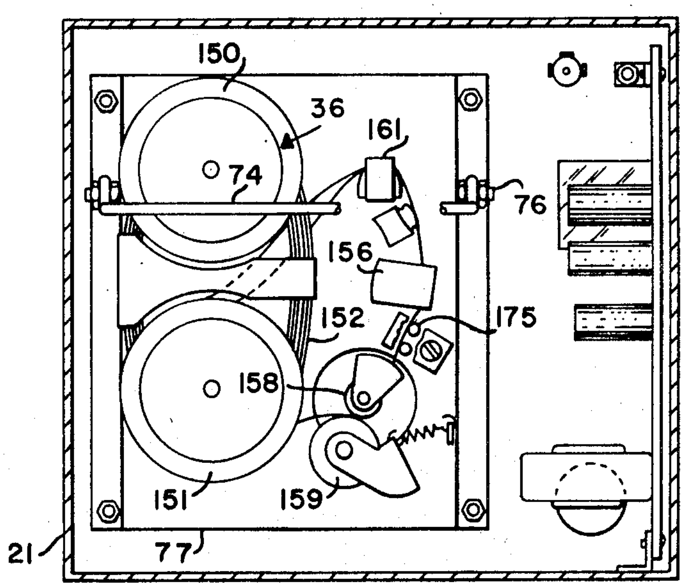
FIG. 3 is a vertical sectional view of the telephone answering apparatus of the present invention taken along line 3—3 of FIG. 2.
Figure 4:
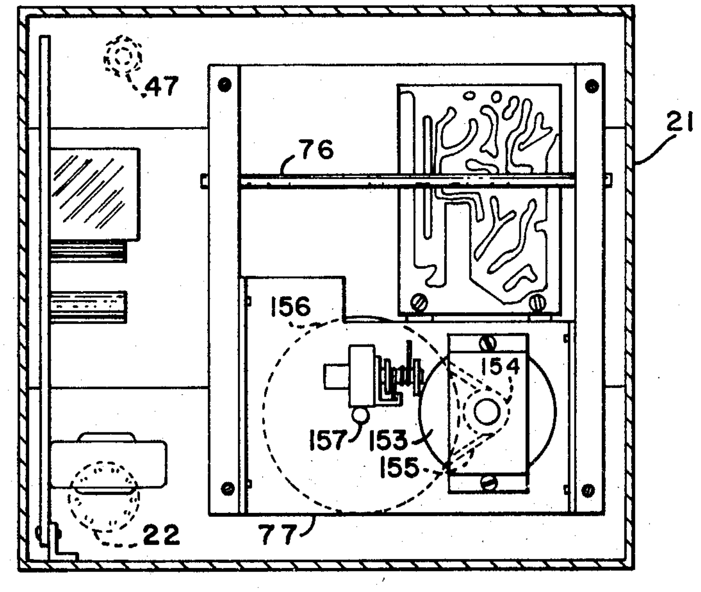
FIG. 4 is a vertical sectional view of the telephone answering apparatus of the present invention taken along line 4—4 of FIG. 2.
Figure 5:
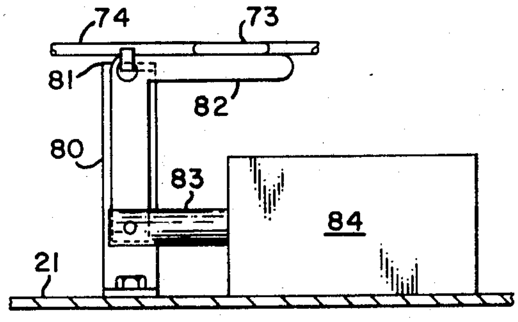
FIG. 5 is a fragmentary elevational view of a portion of the subscriber telephone handset lifting mechanism employed in the telephone answering apparatus of the present invention.

Mounted within the housing 21 is a suitable prerecorded message, endless tape, playback mechanism 36 (FIGS. 2 and 3). The playback mechanism 36 is activated through the circuit 35 in response to the reed, ringing tone sensing switch 25 sensing the energization of the ringing coil of the subscriber telephone device 10. After the handset 11 is raised from the cradle 12 by the handset lifting mechanism 30 to connect electrically the subscriber telephone device 10 to telephone exchange equipment to establish a connection with the telephone device of an incoming caller, the playback mechanism 36 is activated to produce through a suitable speaker 40 (FIG. 2) the prerecorded message which is heard by the incoming caller. A suitable sensitive microphone 50 (FIG. 1) is connected through a jack 51 on the housing 21 to the playback mechanism 36 when it is desired to change the message on the endless tape.

After the prerecorded message is played back to the calling party, the playback mechanism 36 is deactivated, and a suitable record mechanism 45 (FIGS. 1 and 2) is activated through the circuit 35 to record a message from the incoming calling party. A cable 46 connected to a jack 47 on the housing 21 connects the record mechanism 45 to the circuit 35 of the telephone answering apparatus 20. The circuit 35 maintains the record mechanism 45 activated for a predetermined time period.

Upon the expiration of the predetermined time period, the circuit 35 deactivates the record mechanism 45 and causes the lowering of the handset lifting mechanism 30 to its initial position to return the handset 11 to the cradle 12. Now, the telephone answering apparatus 20 is prepared to receive the succeeding incoming call.

According to the present invention, a U-shaped bracket 60 (FIGS. 1 and 2) is fixedly secured to the front wall of the housing 21 at a height even with the height of the cradle 12 of the subscriber telephone device 10. The bracket 60 includes parallel, horizontally disposed arms 61 and 62 that project forwardly from the front wall of the housing 21. Flanges 63 and 64 are formed on the free ends of the arms 61 and 62, respectively, and are directed at right angles and inwardly in confronting relationship. Pads 65 and 66, which are made of suitable soft material, such as felt or sponge, are caused to adhere to the inner walls of the flanges 63 and 64, respectively.

For mechanically connecting the telephone answering apparatus 20 of the present invention with the subscriber telephone device 10, the telephone answering apparatus 20 is placed rearwardly of the subscriber telephone device 10 with the U-shaped bracket 60 above the cradle 12. The handset 11 is removed from the vicinity of the cradle 12. Thereupon, the telephone answering device 20 is lowered to cause the arms 61 and 62 of the U-shaped bracket 60 to enter the space 15 and to embrace the cradle 12 outwardly of the posts thereof with the flanged ends 63 and 64 of the arms 61 and 62, respectively, clasping the forward walls of the posts of the cradle 12, respectively.

The handset lifting mechanism 30 comprises a substantially horizontal lifting member or plate 70 that projects forwardly of the front wall of the housing 21. As shown in FIG. 2, the plate 70 is disposed in the space 14 between the arms 61 and 62 at substantially even height therewith. The plate 70 is arranged to have its free end disposed below the central portion of the handset 11 (FIG. 1), while the handset 11 is seated on the cradle 12. At the distal end of the plate 70 is a rearwardly extending arm 71 (FIG. 2) integrally formed with the plate 70. The arm 71 is received by an opening 72 (FIG. 1) formed in the front wall of the housing 21. A slot 73 (FIGS. 2 and 3) is formed in the inwardly directed end of the arm 71.

For raising and lowering the plate 70, a substantially U-shaped bracket 74 (FIG. 2) has a forwardly loop section 75 thereof seated in the slot 73 of the arm 71. Suitable nuts, bolts and washers fixedly secure the arm 71 to the loop section 75 of the bracket 74. The free ends of the bracket 74 are formed into loops that receive a bar 76. Suitable nuts retain the loop ends of the bracket 74 on the bar 76 for free pivotal movement relative to the axis of the bar. Thus, the bracket 74 is supported by the bar 76 for pivotal movement thereabout.

The bar 76 is mounted on a channel plate 77, which is secured to the bottom wall of the housing 21. To actuate the bracket 74 for raising and lowering of the lifting plate 70, an upright bracket 80 is secured to a ledge formed in the lower wall of the housing 21. An upturned flange 81 is formed at the upper end of the bracket 80. Seated on the flange 81 for pivotal movement thereabout is a right angle bar 82, which extends perpendicular to the bracket 80, the loop section 75 of the bracket 74 and the arm 71. The free end of the bar 82, which projects horizontally, is disposed below the loop section 75 and the arm 71 so as to support the same for raising and lowering. The distal end of the bar 82 which projects downwardly is connected to a plunger 83 of a solenoid 84.

Thus, the retraction of the plunger 83 of the solenoid 84 causes the right angular bar 82 to pivot about the flange 81 of the bracket 80. As a consequence thereof, the horizontal portion of the bar 82 raises the lifting plate 70 and the loop section 75 of the bracket 74 to pivot the same about the axis of the bar 76. The plunger 83 of the solenoid 84 is retracted, when the solenoid 84 is energized and is extended when the solenoid 84 is deenergized. The movement of the plunger in the extended direction enables the lifting plate 70 and the loop section 75 of the bracket 74 to be lowered under the weight of the handset 11. The solenoid 84 is energized through the circuit 35 in response to the read, ringing tone sensing switch 25 sensing the energization of the ringing coil of the subscriber telephone device 10.

When the ringing coil of the subscriber telephone device 10 is energized for signalling an incoming call to the subscriber telephone device 10, the reed, ringing tone sensing switch 25 (FIGS. 1 and 8) is closed by the magnetic field created from the energization of the ringing coil of the subscriber telephone device 10. The closing of the reed, ringing tone sensing switch 25 energizes a relay 100 (FIG. 6) to operate the same over the following path: one side of the switch 25, relay 100, normally closed contacts 122, conductor 130, conductor 131, source of A.C. electrical power 132, closed on-off switch 133, fuse 134, rectifier 135 and back to the other side of the switch 25.

The energization of the relay 100 closes contacts 101 to complete a locking or holding circuit to maintain the relay 100 energized over the following path: relay 100, contacts 122, conductor 130, conductor 131, source of A.C. electrical power 132, switch 133, fuse 134, rectifier 135, contacts 101 and back to relay 100.

Contacts 103 close upon the energization of the relay 100 to energize the solenoid 84 over the following path: one side of the solenoid 84, contacts 103, conductor 140, conductor 131, source of A.C. electrical power 132, switch 133, fuse 134, conductor 141, and back to the solenoid 84. It is the energization of the solenoid 84 that causes the lift mechanism 30 to raise the handset 11 from the cradle 12, thereby connecting the subscriber telephone device 10 to the incoming call telephone device through telephone exchange equipment.

Contacts 107 also close upon the energization of the relay 100 to complete an activating circuit for the prerecorded message, endless tape, playback mechanism 36 over the following path: playback mechanism 36, conductor 131, source of A.C. electrical power 132, switch 133, fuse 134, conductor 141, contacts 107, conductor 143 and back to the playback mechanism 35.

The playback mechanism 36 comprises idler rollers 150 and 151 (FIGS. 2 and 3), which are supported by the channel plate 77 with the axis of rotation thereof spaced in the vertical direction. Trained around the rollers 150 and 151 is an endless magnetic tape 152 with a prerecorded message thereon for an incoming calling party, which requests the caller to leave his name, address, telephone number and to advise of the general purpose of the call.

For rotating the endless tape 152 about the idler rollers 150 and 151, a suitable motor 153 (FIGS. 2 and 4) is mounted by a suitable bracket to the channel plate 77. It is the motor 153 of the playback mechanism 36 that is energized by the closing of the contacts 107. A pulley 154 is fixed to the shaft of the motor 153 for rotation therewith. Trained around the pulley 154 is a drive belt 155, which is also trained around a driven pulley 156. The driven pulley 156 is supported by the channel plate 77 for rotation and is fixedly secured to a shaft 157 (FIG. 4) for imparting rotary movement thereto. The shaft 157 is received by an opening in the channel plate 77 and has its free end disposed adjacent to the rollers 150 and 151. A right angle bracket supports the free end of the shaft 157 for rotation. Fixed to the free end of the shaft 157 is a capstan or drive roller 158 (FIG. 3), which engages the endless tape 152 to advance the same around the idler rollers 151 and 152. Facing the drive rollers 158 with the endless tape 152 therebetween is a pinch roller 159 which serves to provide driving engagement between the drive roller 158 and the endless tape 152. A guide post 161 guides the endless tape 152 over a predetermined path.

Adjacent the path of travel of the endless tape 152 is disposed a reproduce or playback head 156, which converts the magnetically recorded information on the endless tape 152 into audio signals. The output of the playback head 165 is connected to a suitable amplifier 166 (FIG. 6), which has its output connected to the speaker 40. Thus, the prerecorded message on the endless tape 152 is reproduced in the speaker 40 for transmission through the subscriber telephone device 10 through the telephone exchange equipment and to the telephone device of the incoming caller. The microphone 50, an erase head and a record head enables the prerecorded message on the endless tape 152 to be changed.

Figure 6:
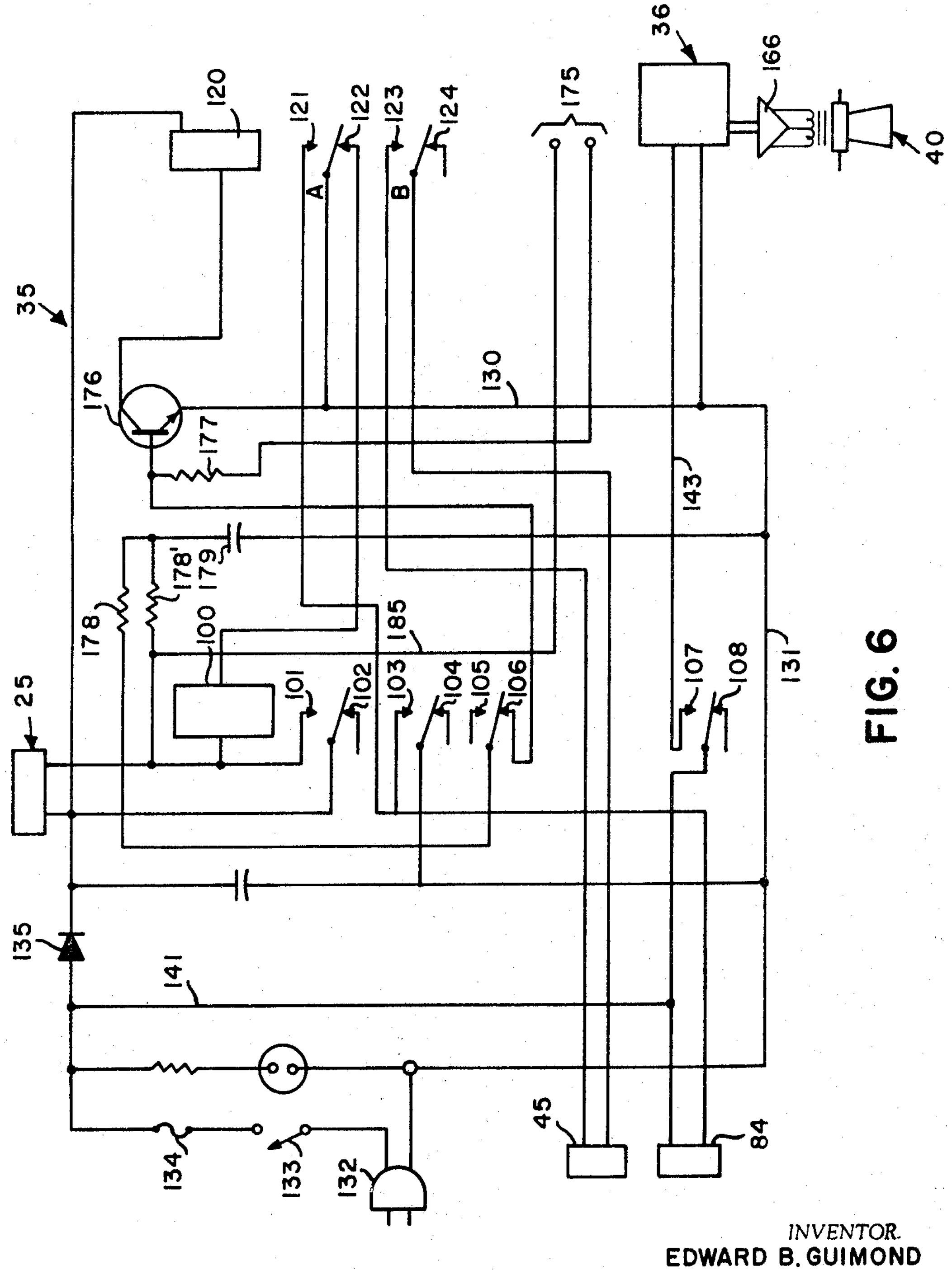
FIG. 6 is a schematic diagram of the control circuit employed in the telephone answering apparatus illustrated in FIGS. 1-5.

On the portion of the endless tape 152 following the completion of the prerecorded message thereon and preceding the succeeding cycle of the prerecorded message is a conductor strip 170 (FIG. 2), such as a metal foil. Disposed adjacent to the path of travel of the endless tape 152 and spaced from the reproduce head 165 in the direction of travel of the endless tape 152 is a conductor strip sensing device 175 (FIGS. 3 and 6). The conductor strip sensing device 175 is in the form of terminal posts spaced apart in the direction of travel of the endless tape 152 with the space therebetween less than the width of the conductor strip 170 so that the conductor strip 170 as it advances beyond the sensing device 175 contacts simultaneously the terminal posts thereof.

By temporarily electrically connecting the normally open terminals of the strip sensing device 175 by establishing a closure therebetween through the conductor strip 170, a transistor 176 (FIG. 6) is caused to conduct by charging the base electrode thereof over the following path: emitter electrode of the transistor 176, conductor 130, conductor 131, source of A.C. electrical power 132, switch 133, fuse 134, rectifier 135, contacts 101, conductor 185, sensing device 175, resistor 177 and the base electrode of the transistor 176.

Through the application of the direct current voltage on the base of the transistor 176 in the manner just described, the transistor 176 conducts. Connected to the collector electrode of the transistor 176 is the relay 120 which is energized by the conduction of the transistor 176 over the following path: relay 120, collector electrode of the transistor 176, emitter electrode of the transistor 176, conductor 130, conductor 131, source of A.C. electrical power 132, switch 133, fuse 134, rectifier 135, and back to the relay 120.

The energization of the relay 120 opens contacts 122, which breaks the previously described holding circuit for the relay 100, thereby causing the relay 100 to be deenergized and to open its holding contacts 101. Contacts 123 close to activate the recording mechanism 45 over the following path: recording mechanism 45, contacts 123, and back to the recording mechanism 45.

As shown in FIG. 1, the recording mechanism 45 is a self-contained unit with its individual source of electrical power. In practice, the recording mechanism 45 may be a commercially available portable type tape recorder, such as the Jeco tape recorder, Model No. PC 104. The just described activating circuit for the recording mechanism 45, in effect, closes the operating circuit for the motor thereof that advances the magnetic recording tape thereon. The recording mechanism 45 is located adjacent the receiver of the handset 11 so that its microphone within the housing thereof picks up the message from the calling party. It is the recording mechanism 45 that records the message from the incoming caller through the subscriber telephone device 10.

When the relay 100 is de-energized, the contacts 107 back to open the energizing circuit for the motor of the playback mechanism 36, thereby deactivating the playback mechanism 36. The de-energization of the relay 100 opens the contacts 103 which, in turn, opens the initial energizing circuit for the solenoid 84 in a manner previously described. However, the solenoid 84 is maintained energized by the closing of the contacts 121 over the following path: solenoid 84, contacts 121, conductor 130, conductor 131, source of A.C. electrical power 132, switch 133, fuse 134, conductor 141 and back to the solenoid 84.

While the contacts 101 of the relay 100 were closed, the capacitor 179 was charged over the following path: capacitor 179, conductor 131, source of electrical power 132, switch 133, fuse 134, rectifier 135, contacts 101, resistor 178′ and back to the capacitor 179. When the relay 100 is de-energized, contacts 101 break to open to charge path for the capacitor 179. In addition thereto, contacts 106 close to complete a discharge circuit for the capacitor 179 and also to impress the voltage charge on the capacitor 179 onto the base electrode of the transistor 176 in the following manner: base electrode of the transistor 176, contacts 106, resistor 178, capacitor 179, conductor 130 and the emitter electrode of the transistor 176.

The resistance-capacitance network of the resistor 178 and the capacitor 179 is selected so that the capacitor 179 will maintain a sufficient charge thereon to maintain the transistor 176 in a conductive mode for a predetermined period of time, which in the exemplary embodiment is fifty seconds. Thus, the record mechanism 45 will remain in operation for the predetermined time duration to receive a message from the incoming caller through the subscriber telephone answering device 20.

The resistor 178′ is considerably smaller than the resistor 178 so that the capacitor 179 could charge in a short time duration, but discharges at a much slower rate, such as the fifty second period. For example, the resistor 178 could be in the order of 1 megaohm, while the resistor 178′ could be in the order of 22K ohms. The emitter electrode of the transistor 176 is a common electrode for the transistor 176 and is connected to one side of the source of power through the conductor 13, which may be referred to as a ground connection.

After the capacitor 179 discharges to the potential in which the transistor 176 no longer conducts, the relay 120 is de-energized. As a consequence thereof, contacts 123 break to open the activating circuit to the record mechanism 45. Thereupon, the motor of the record mechanism 45 stops operating to discontinue the advancement of the magnetic tape in the record mechanism 45. Also, the contacts 121 break to de-energize the solenoid 84. This results in the lifting mechanism 30 lowering the handset 11 onto the cradle 12 to release the subscriber telephone device 10 from the telephone exchange. The telephone answering apparatus 20 and the subscriber telephone device 10 is now prepared to receive the succeeding incoming call.

In the operation of the telephone answering apparatus 20, an incoming call to the subscriber telephone device 10 energizes the ringing tone coil thereof. Thereupon, the reed, ringing tone sensing switch 25 closes in response to the creation of the magnetic field by the ringing coil. Thereupon, the relay 100 is energized. The energization of the relay 100 closes contacts 101 to hold the relay 100 energized. Contacts 103 close to energize the handset lifting mechanism solenoid 84. Upon the energization of the solenoid 84, the handset lifting plate 70 is raised to lift the handset 11 from the cradle 12 to release the plunger switches of the subscriber telephone device 10. Now, the telephone device of the incoming caller is connected to the subscriber telephone device 10 through telephone exchange equipment.

The energization of the relay 100 also closed the contacts 107, which activated the playback mechanism 36. The motor 153 of the playback mechanism 36 is energized, which causes the drive roller 158 to advance the endless tape 152. The reproduce head 156 converts the magnetically recorded information on the endless tape 152 into audio signals. The audio signals are amplified by the amplifier 166 and produced into sound by the speaker 40. The pre-recorded message on the endless tape 152 is transmitted to the telephone device of the incoming caller through the subscriber telephone device 10 and the telephone exchange equipment.

On the portion of the endless tape 152 following the completion of the prerecorded message thereon and preceding the succeeding cycle of the prerecorded message is the conductor strip 170. Beyond the playback head 156 in the direction of travel of the endless tape 152 is the sensing device 175. The sensing device 175 has its terminal posts temporarily interconnected by contact with the conductor strip 170. This results in the immediate conduction of the transistor 176.

While the transistor 176 is in the conducting mode, the relay 120 is energized. The energization of the relay 120 opens contacts 122 to open the holding circuit for the relay 100 and to de-energize the relay 100. Contacts 107 close to maintain the handset lifting mechanism solenoid 84 energized, while the relay 100 is de-energized. Contacts 123 close to activate the record mechanism 45. The de-energization of the relay 100 deactivates the playback mechanism 36, which is now prepared for the succeeding incoming call.

While the relay 100 was energized, the capacitor 179 was charged through the closing of the contacts 101. The charge on the capacitor 179 is applied to the base electrode of the transistor 176, which will remain in a conductive mode as long as a sufficient charge remains in the capacitor 179 to maintain the transistor 176 conductive. When the relay 100 is de-energized, the capacitor 179 discharges through the resistor 178 and the contacts 106. The discharge time of the capacitor 179 is rather slow and in the preferred embodiment discharges at a rate so that the transistor 176 remains conductive for fifty seconds. During this time, the relay 120 remains energized and the message recording mechanism 45 remains operated to receive the message from the incoming caller through the subscriber telephone device 10 and by way of the sensitive microphone built in the message recording mechanism 45.

After the fifty second period has terminated, the transistor 176 is non-conducting and the relay 120 is de-energized. As a consequence thereof, contacts 123 break to deactivate the message recording mechanism 45 and to stop the operation of the tape drive motor thereof. Contacts 121 break to de-energize and release the handset lifting mechanism solenoid 84. Contacts 122 make to prepare the energizing circuit for the relay 100. The lifting plate 70 of the handset lifting mechanism 30 is lowered to seat the handset 11 on the cradle 12 and thereby to depress the plunger switches of the subscriber telephone device 10 for releasing the subscriber telephone device 10 from the telephone exchange equipment. Now, the subscriber telephone device 10 and the telephone answering apparatus 20 is prepared to receive the succeeding incoming call. The subscriber, when convenient, may playback the recorded messages from the message record mechanism 45.

It is to be understood that modifications and variations of the embodiments of the invention disclosed herein may be resorted to without departing from the spirit of the invention.

Having thus described my invention what I claim as new and desire to protect by Letters Patent is:

What is claimed is:

1. A telephone answering apparatus for a subscriber station and an incoming call station comprising a ringing tone sensing device energized in response to an incoming call, a relay circuit connected directly to said ringing tone sensing device and operated in response to the energization of said ringing tone sensing device, a handset lifting mechanism operated to establish a connection between the subscriber station and the incoming call station in response to the operation of said relay circuit, a playback mechanism for producing a pre-recorded message for transmission to the incoming caller operated in response to the operation of said relay circuit, said relay circuit being arranged to remain operated until de-energized, said playback mechanism being formed with an endless tape with a conductor strip on said endless tape indicating the end of the pre-recorded message, means for sensing said conductor strip, a circuit operated in response to said means sensing said conductor strip for de-energizing said relay circuit and maintaining said handset lifting mechanism operated, a record mechanism operated by the operation of said circuit for recording an incoming call, and a time delay circuit for said circuit for maintaining said circuit operative for a predetermined time duration.

2. A telephone answering apparatus as claimed in claim 1 wherein said time delay circuit comprises a resistance-capacitance network.

3. A telephone answering apparatus as claimed in claim 1 wherein said circuit includes a relay operative for controlling the operation of said record mechanism, a transistor having its output connected to said relay for controlling the energization of said relay, and wherein said time delay circuit comprises a resistance-capacitance network connected to said transistor for controlling the conduction thereof.

4. A telephone answering apparatus as claimed in claim 3 wherein said circuit renders said transistor conductive, and wherein said resistance-capacitance network has its discharge time controlled to control the time duration for the conduction of said transistor.

5. A telephone answering apparatus as claimed in claim 1 wherein said ringing tone sensing device is energized in response to a magnetic field.

6. A telephone answering apparatus as claimed in claim 1 wherein said ringing tone sensing device comprises a reed ringing tone sensing device.

7. A telephone answering apparatus as claimed in claim 1 wherein said ringing tone sensing device is an induction coil.

References Cited

UNITED STATES PATENTS

| | | | |
|---|---|---|---|
| 2,539,139 | 1/1951 | Jordanoff et al. | 179—6 |
| 2,670,403 | 2/1954 | Mack | 179—6 |
| 2,703,821 | 3/1955 | Kopp et al. | 179—6 |
| 2,823,262 | 2/1958 | Kilby et al. | 179—6 |
| 3,296,382 | 1/1967 | Klumb et al. | 179—6 X |
| 3,376,390 | 4/1968 | Hashimoto | 179—6 |

BERNARD KONICK, Primary Examiner

RAYMOND F. CARDILLO, Jr., Assistant Examiner